United States Patent [19]

Anthony

[11] Patent Number: 5,571,023
[45] Date of Patent: Nov. 5, 1996

[54] ELECTRICAL CONNECTOR HOUSING WITH LID

[75] Inventor: John C. Anthony, Fairfield, Conn.

[73] Assignee: Hubbell Incorporated, Orange, Conn.

[21] Appl. No.: 442,841

[22] Filed: May 17, 1995

[51] Int. Cl.$^6$ ................................ H02G 3/14
[52] U.S. Cl. .................. 439/142; 220/242; 439/144
[58] Field of Search ....................... 439/142, 144; 220/241, 242, 324, 334, 343, 348; 174/66, 67

[56] References Cited

U.S. PATENT DOCUMENTS

| | | | |
|---|---|---|---|
| 1,818,290 | 8/1931 | Wulle | 200/50 B |
| 2,880,264 | 3/1959 | Ruskin | 174/67 |
| 3,140,344 | 7/1964 | Slater et al. | 174/67 |
| 3,203,747 | 8/1965 | Vercellotti | 220/242 |
| 3,716,815 | 2/1973 | Riches . | |
| 3,811,004 | 5/1974 | Moore | 220/242 |
| 3,950,059 | 4/1976 | Anhalt et al. . | |
| 3,982,804 | 9/1976 | Marechal . | |
| 4,031,312 | 6/1977 | Coleman et al. | 174/52 R |
| 4,072,381 | 2/1978 | Burkhart et al. | 439/144 |
| 4,134,516 | 1/1979 | Sullo | 220/242 |
| 4,197,959 | 4/1980 | Kramer | 220/242 |
| 4,245,875 | 1/1981 | Shaffer et al. . | |
| 4,500,008 | 2/1985 | Cook | 220/242 |
| 4,553,000 | 11/1985 | Appleton | 200/50 B |
| 4,784,610 | 11/1989 | Stuart | 439/144 |
| 4,803,307 | 2/1988 | Shotey | 174/67 |
| 4,988,832 | 1/1991 | Shotey | 174/67 |
| 5,228,584 | 7/1993 | Williams, Jr. . | |
| 5,298,701 | 3/1994 | Sandor | 200/50 B |

FOREIGN PATENT DOCUMENTS 1491261  8/1967  France .................. 439/142

OTHER PUBLICATIONS

GE Wiring Devices–Full Line Catalog–1989 p. D5.
Killark Catalog, Electrical Construction Products, 1994, Section 1, p. 1 and Section 4, pp. 1–16.
Hubbell Catalog, Wiring Device & Systems, Kellems Wire Management Marine Wiring Products, 1995, Section D, pp. D24–D28, Section E, pp. E1–E14 and Section M, pp. M1–M25.

*Primary Examiner*—Gary E. Elkins
*Attorney, Agent, or Firm*—Jerry M. Presson; David L. Tarnoff

[57] ABSTRACT

An electrical connector housing with a lid for covering electrical contacts of an electrical connector mounted therein. Electrical connector housing has a tubular body portion for supporting an electrical connector therein, a mounting flange portion for mounting the electrical connector housing to a wiring enclosure, and a lid for covering an open end of the tubular body portion and the electrical connector. The lid is pivotally coupled at one end to the mounting flange and releasably latched to the mounting flange at its other end. A torsion spring is used to normally bias the lid to a closed position in which the open end of the tubular body portion and the electrical connector are covered. The latch is integrally molded with the lid to provide a snap-fit.

20 Claims, 8 Drawing Sheets

ELECTRICAL CONNECTOR HOUSING WITH LID

FIELD OF THE INVENTION

The present invention generally relates to an electrical connector lid for providing a weathertight seal, More specifically, this invention relates to an electrical connector housing having a lid for sealing the electrical contacts of a receptacle or inlet. The lid has an integrally formed latch which keeps the lid from opening under the force of a water stream.

BACKGROUND OF THE INVENTION

All electrical connectors which are exposed to adverse environmental conditions require a cover or lid to seal and protect the electrical elements from grid, moisture and other elements. This is especially relevant in outdoor electrical connectors which are subject to a variety of weather conditions such as moisture, rain, snow and other environmental conditions.

Weatherproof electrical connector covers or arrangements are well known in the prior art for protecting the electrical contacts of the electrical connector. For example, U.S. Pat. No. 4,553,000 to Appleton discloses an electrical connector assembly having a hinge mounted cover which is normally biased by a spring to close off the open front end of the electrical connector. The interface between the lid or cover and the electrical connector housing is not waterproof by itself, and thus, the cover is provided with a foam gasket to seal the interface therebetween.

While many attempts have been made to provide a cover or lid for the opening of electrical connector, these prior art devices suffer from numerous disadvantages. Many of these prior art devices require many parts and are expensive to manufacture. In addition, many of these prior art devices do not provide a positive latch for the cover.

This invention addresses these needs in the art, along with other problems and needs which will become apparent to those skilled in the art once given this disclosure.

SUMMARY OF THE INVENTION

Accordingly, one object of the present invention is to provide an electrical connector housing with a lid arrangement which provides a watertight seal.

Another object of the present invention is to provide an electrical connector housing with a lid which is relatively inexpensive to manufacture.

Still another object of the present invention is to provide an electrical connector housing with a lid which has a latch to prevent inadvertent movement of the lid.

The foregoing objects are basically attained by an electrical connector housing for an electrical connector, comprising: a flange portion with an opening formed therein for accessing electrical contacts of the electrical connector; and a lid having a body portion pivotally coupled to the flange portion at a first end by a hinge assembly for selectively covering the opening in the flange portion and releasably coupled to the flange portion at a second end by a latch assembly, the latch assembly including a resilient U-shaped latch integrally formed with the body portion as a one piece, unitary member, the latch having a first leg coupled to the integral latch surface thereon, and a locking surface integrally formed with the flange portion for releasably engaging the latch surface of the latch via a snap-fit.

Other objects, advantages and salient features of the present invention will become apparent to those skilled in the art from the following detailed description, which taken in conjunction with the annexed drawings, discloses a preferred embodiment of the present invention.

BRIEF DESCRIPTION OF THE DRAWINGS

Referring now to the drawings which form a part of this original disclosure.

DETAILED DESCRIPTION OF THE INVENTION

Referring initially to FIGS. 1–5, an electrical connector housing 10 in accordance with the present invention is illustrated in connection with an electrical connector 12 in the form of a receptacle or female electrical connector. Electrical connector housing 10 includes a tubular body portion 20 for supporting electrical connector 12 therein, a mounting flange portion 22 for mounting electrical connector housing 10 to a wiring enclosure (not shown) and a lid 24 for covering open end 26 of tubular body portion 20 and electrical connector 12.

While electrical connector housing 10 is illustrated in conjunction with a rotatable locking type electrical connector, it will become apparent to those skilled in the art from this disclosure that electrical connector housing 10 can be utilized with other types of electrical connectors such as pin type electrical connectors. Moreover, electrical connector housing 10 can be designed to support either a male electrical connector or a female electrical connector without departing from the scope of the present invention.

Tubular body portion 20 and mounting flange portion 22 of electrical housing 10 are integrally formed together as a one piece, unitary member from a suitable rigid material. Preferably, tubular body portion 20 and mounting flange portion 22 are constructed of a suitable rigid, plastic material such as a UV-stabilized polyester blend, e.g., GE's Valox 3570.

As best seen in FIGS. 5–8, tubular body portion 20 has an open end 26 for receiving electrical connector 12 therein. Electrical connector 12 is mounted within tubular body portion 20 by three threaded fasteners or screws 28 which are received in holes 30 of mounting lugs 32 which are formed towards the rear end of tubular body portion 20. The rear end of tubular body portion 20 is opened for receiving electrical wires (not shown) for supplying power to electrical connector 12.

At the open end 26 of tubular body portion 20, the interior surface of tubular body portion 20 is provided with a pair of polarizing slots 36 for receiving a polarized electrical connector therein. Also, open end 26 of tubular body portion 20 extends outwardly from the exterior face of mounting flange portion 22 to form a tubular or annular extension 38 which is normally engaged by lid 24 to close or cover open end 26 of tubular body portion 20 as discussed below.

Mounting flange portion 22 is a substantially rectangular member having four mounting holes 40 for receiving screws (not shown) to mount electrical connector housing 10 to an electrical enclosure (not shown). Mounting flange portion 22 also includes a pair of pivot lugs 42 and 44 located at its upper end above extension 38 and a latch bar 46 located below extension 38.

Figure 1:
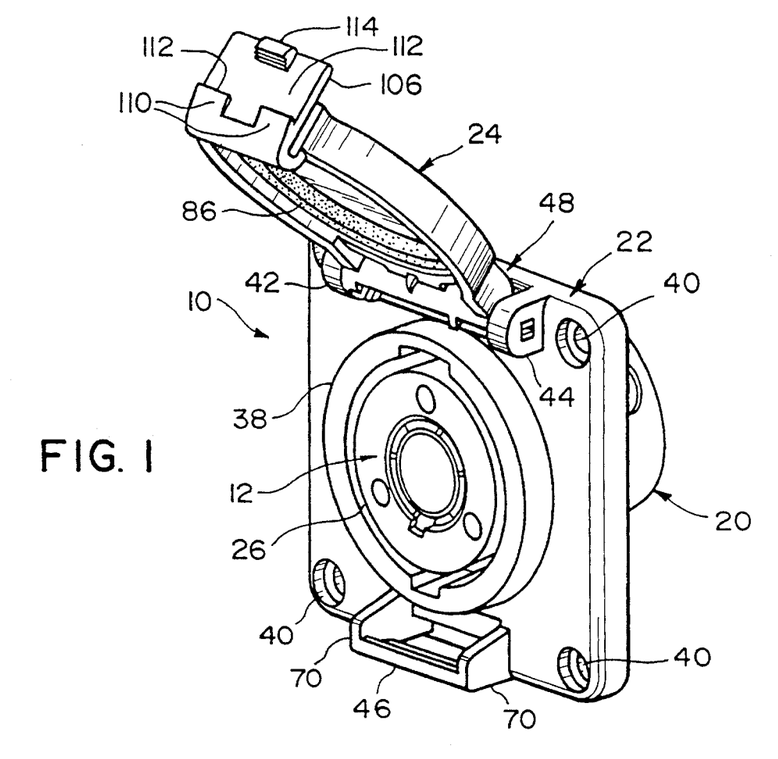
FIG. 1 is a front perspective view of an electrical connector housing in accordance with the present invention having its lid pivoted to an opened or unlatched position and having a receptacle or female electrical connector mounted therein.
Figure 2:
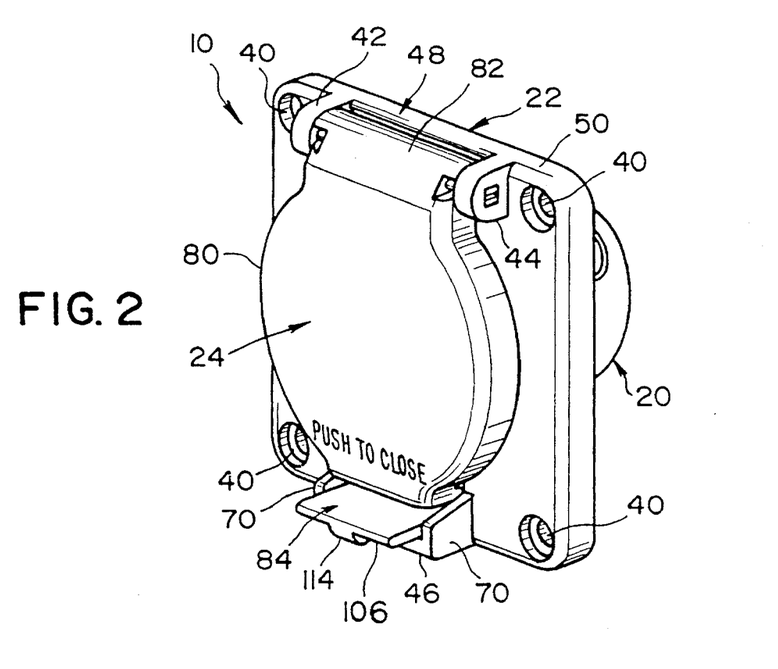
FIG. 2 is a front perspective view of the electrical connector housing illustrated in FIG. 1 with its lid pivoted to a closed or latched position.
Figure 3:
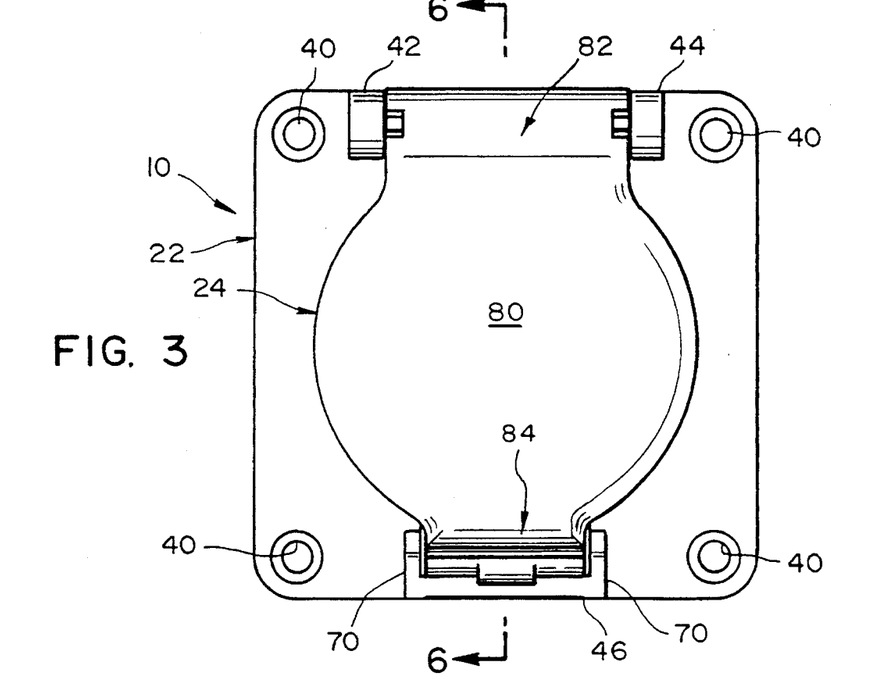
FIG. 3 is a front elevational view of the electrical connector housing illustrated in FIG. 1 and 2 with its lid pivoted to a closed or latched position.
Figure 4:
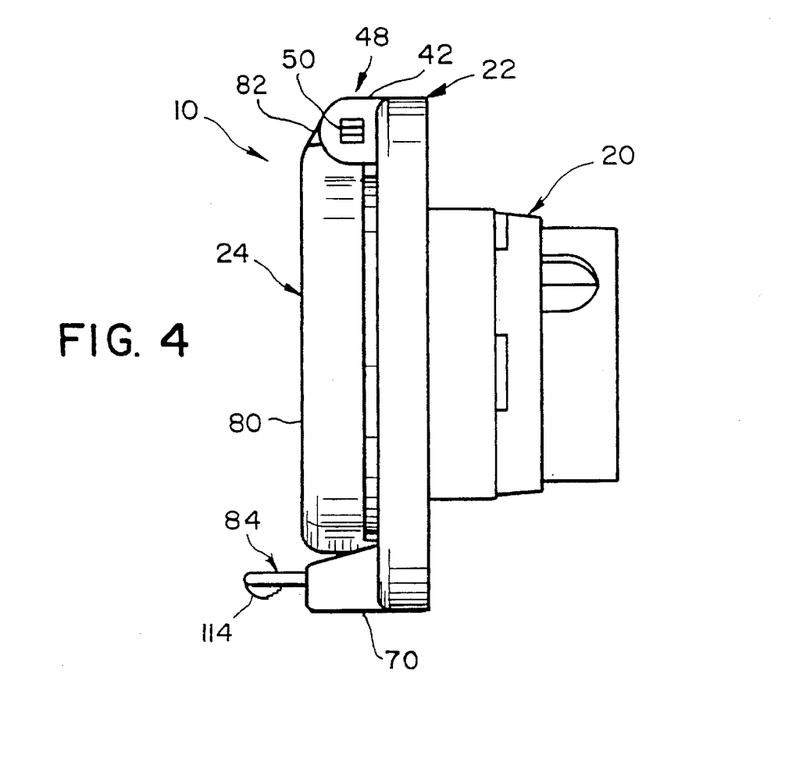
FIG. 4 is a right side elevational view of the electrical connector housing illustrated in FIGS. 1–3 with its lid pivoted to a closed or latched position.
Figure 9:
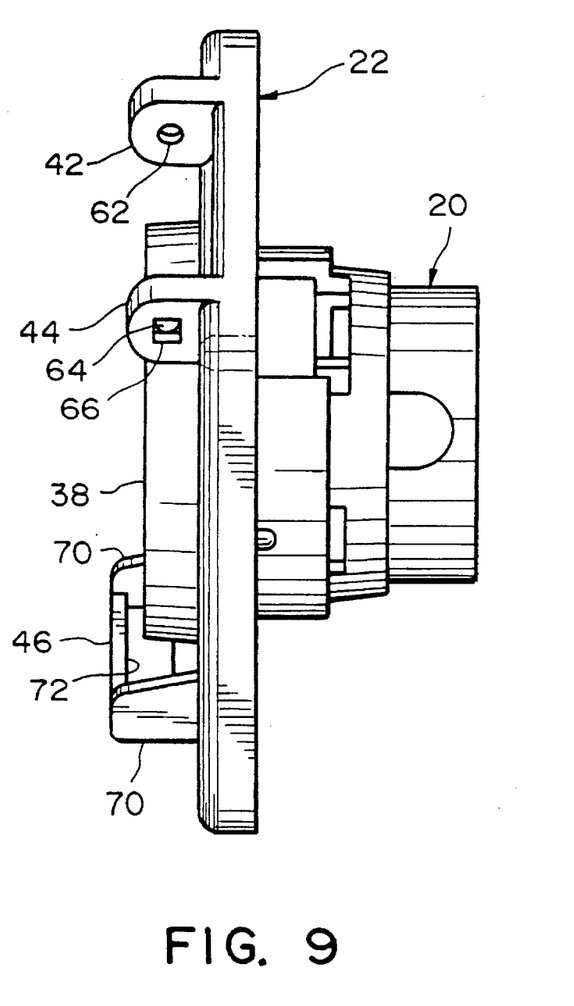
FIG. 9 is a top right corner view of the electrical connector housing illustrated in FIG. 1–7 with the lid and the receptacle or female electrical connector removed for clarity.
Figure 10:
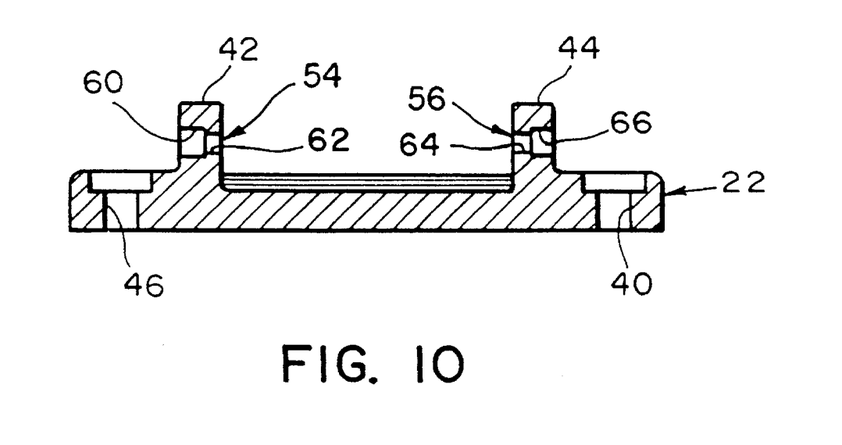
FIG. 10 is a transverse cross-sectional view of the mounting flange portion of the electrical connector housing illustrated in FIGS. 8 and 9 taken along section line 10—10 of FIG. 8.
Figure 11:
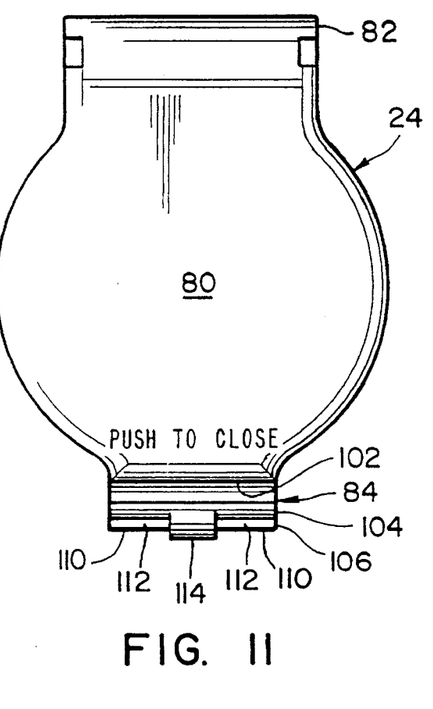
FIG. 11 is a front elevational view of the lid for the electrical connector housing illustrated in FIGS. 1–7.
Figures 15, 16:
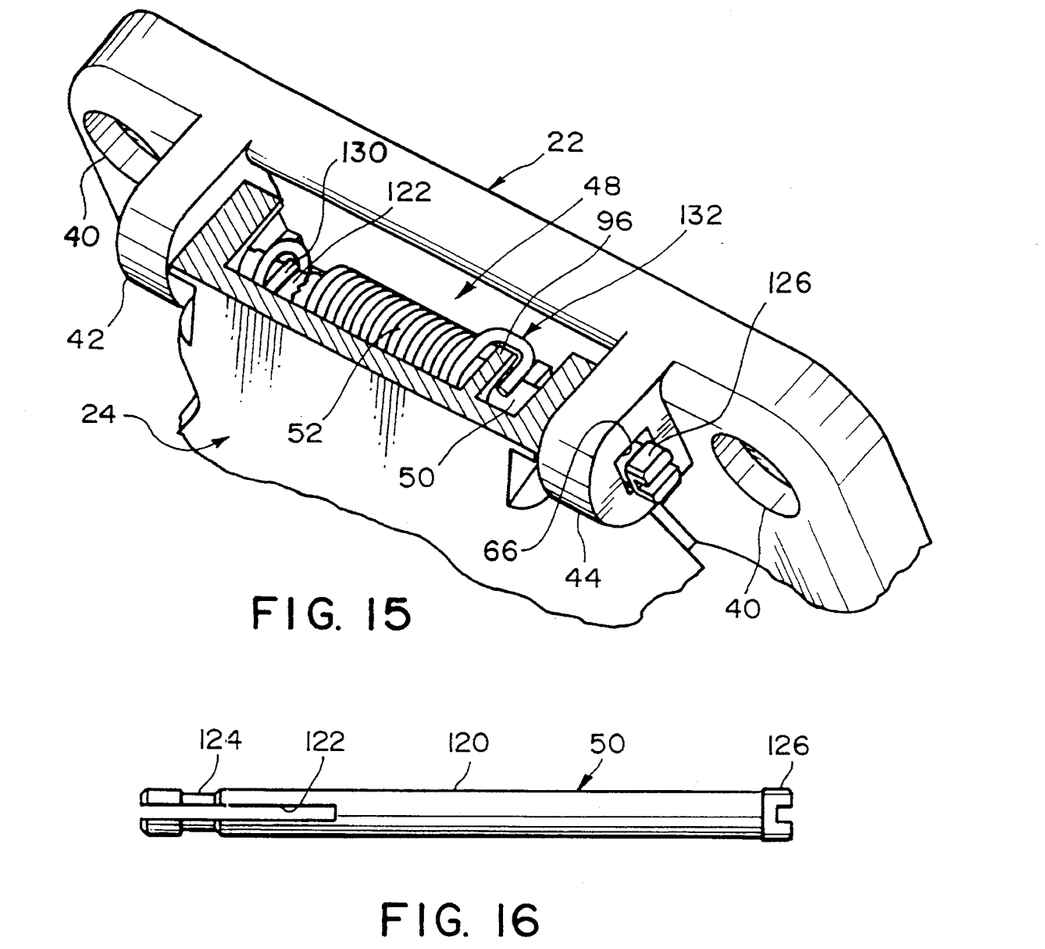
FIG. 15 is a partial top perspective view of the hinge assembly of the electrical connector housing illustrated in FIGS. 1–7 with portions of the lid, the spring and the hinge pin broken away for clarity.
FIG. 16 is a front side elevational view of the hinge pin for the electrical connector housing illustrated in FIGS. 1–7.

As best seen in FIGS. 1, 2 and 15, lid 24 is pivotally coupled to mounting flange portion 22 by hinge assembly 48, which includes pivot lugs 42 and 44 of mounting flange portion 22, as well as a pivot pin 50 and a torsion spring 52 to bias lid 24 to a closed position. More specifically, pivot lugs 42 and 44 each includes a pivot hole 54 and 56, respectively, for receiving pivot pin 50 therein. As seen in FIGS. 9 and 10, pivot hole 54 has a first substantially cylindrical section 60 and a second substantially cylindrical section 62, which is smaller than first section 60. Pivot hole 56 includes a first cylindrical surface 64 and a rectangular tubular surface 66. Pivot holes 54 and 56 of lugs 42 and 44 are designed to non-rotatably hold pivot pin 50 in place as discussed below. Lugs 42 and 44 of mounting flange portion 22 are spaced sufficiently apart to receive one end of lid 24 therebetween.

Figure 5:
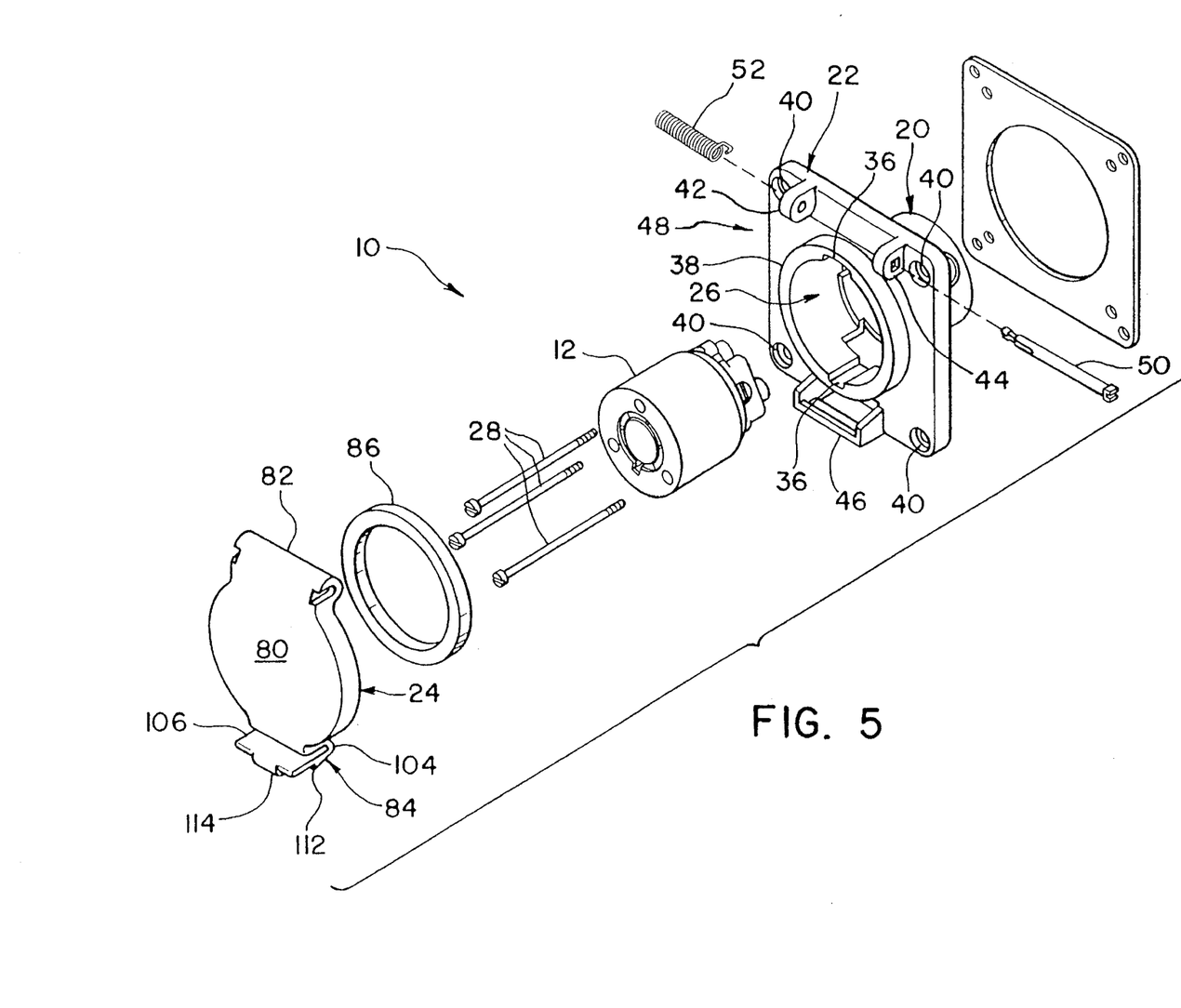
FIG. 5 is an exploded, front perspective view of the electrical connector housing illustrated in FIGS. 1–4 being used with a receptacle or female electrical connector.
Figure 6:
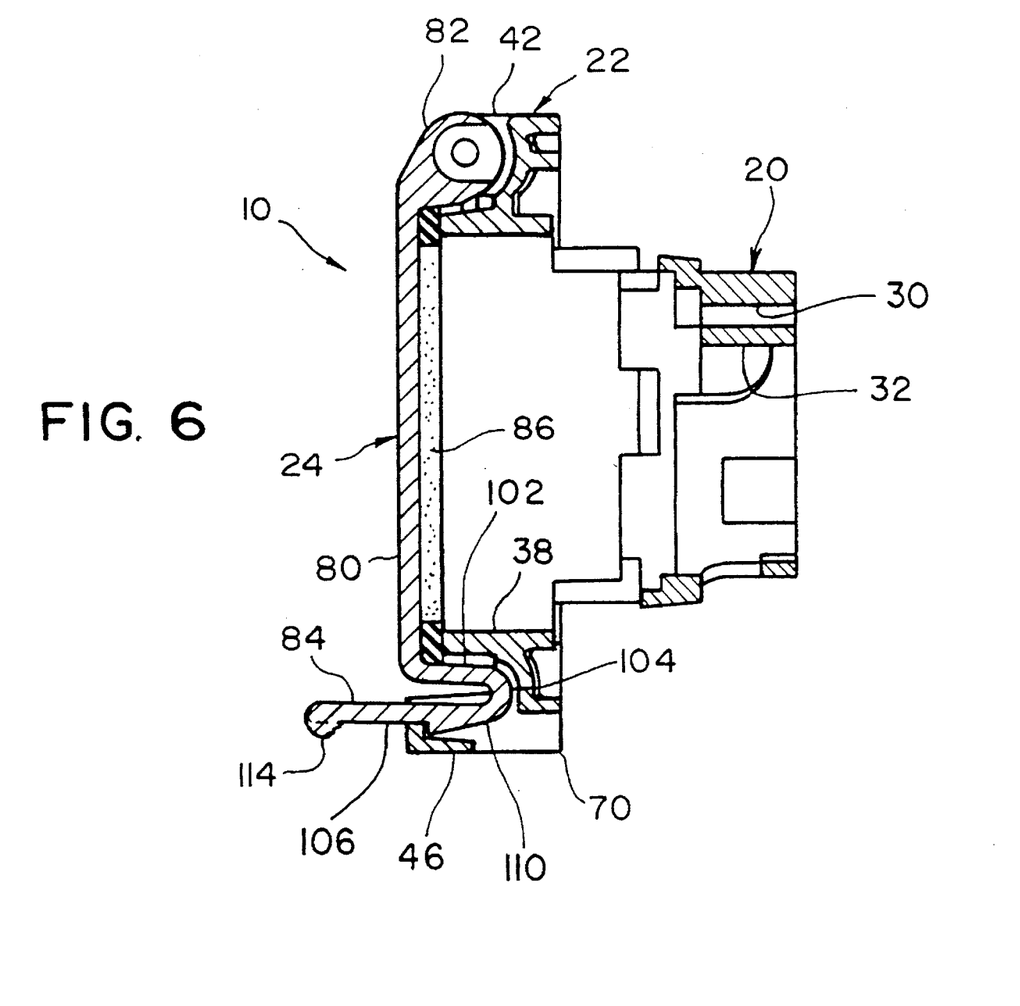
FIG. 6 is a longitudinal cross-sectional view of the electrical connector housing illustrated in FIGS. 1–5 taken along section line 6—6 of FIG. 3 with the receptacle or female electrical connector removed for clarity.
Figure 7:
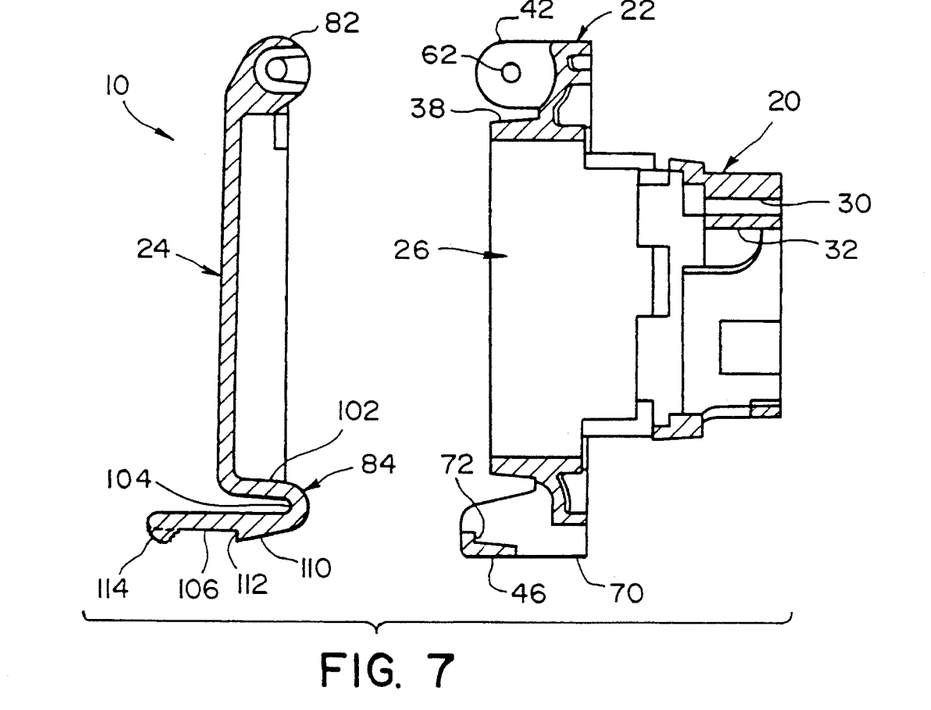
FIG. 7 is an exploded, longitudinal cross-sectional view of the electrical connector housing illustrated in FIGS. 1–6 with the receptacle or female electrical connector removed for clarity.
Figure 8:
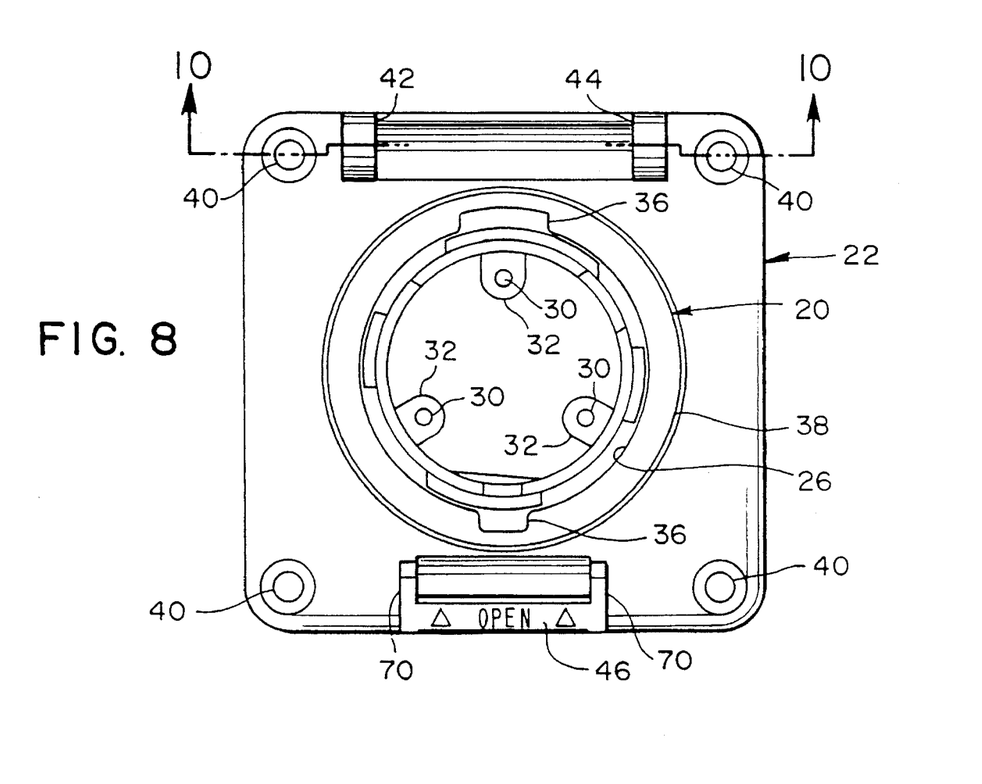
FIG. 8 is a front elevational view of the electrical connector housing illustrated in FIGS. 1–7 with the lid and the receptacle or female electrical connector removed for clarity.

Referring now to FIGS. 5–7, latch bar 46 is coupled to mounting flange portion 22 by a pair of support flanges or members 70 which extend substantially perpendicular to mounting flange portion 22 and spaces latch bar 46 outwardly from the exterior surface of mounting flange portion 22. Latch bar 46 is located at the free ends of support flanges 70, and has a somewhat L-shaped configuration so as to form a locking surface 72. Locking surface 72 extends substantially parallel to the front, exterior face of mounting flange portion 22 for releasably engaging lid 24 as discussed below.

As seen in FIGS. 11–14, lid 24 is, preferably, integrally formed as a one piece, unitary member out of a suitable rigid yet slightly flexible material such as a hard, rigid plastic material. For example, lid 24 is preferably constructed of a UV-stabilized polyester blend such as GE's Valox 3570.

Lid 24 includes a substantially circular cup-shaped body portion 80 for covering open end 26 of tubular body portion 20 with an elongated pivot lug 82 located at one end for pivotally coupling to mounting flange portion 22 via pin 50, and an integral curved-beam snap latch member 84 located 180° from pivot lug 82 for releasably engaging latch bar 46 to releasably lock lid 24 over open end 26 of tubular body portion 20.

As seen in FIGS. 5–7, body portion 80 has a ring gasket 86 secured to its interior surface preferably by a suitable adhesive. Gasket 86 is constructed of a suitable compressible material such as foam rubber or the like. Gasket 86 has an inner and outer diameter such that gasket 86 engages the circular free edge of extension 38 to create a watertight seal between lid 24 and tubular body portion 20 when lid 24 is in its latched position. Stated differently, when lid 24 is pivoted to its closed position and is latched, ring gasket 86 is compressed against the front edge of tubular extension portion 38 to form a watertight seal therebetween.

Figure 12:
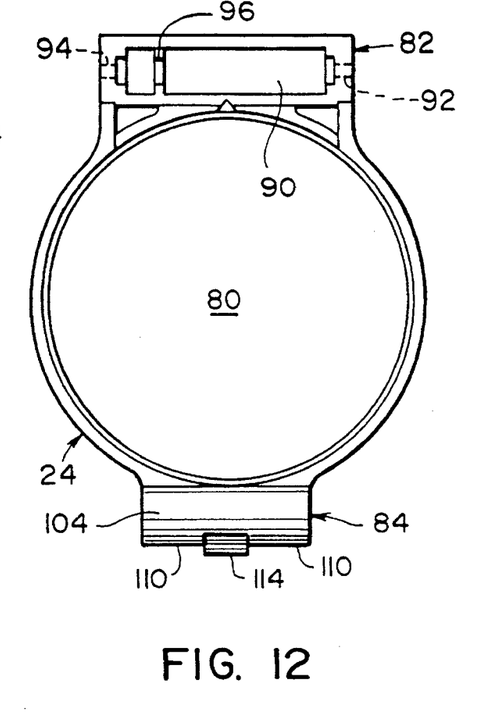
FIG. 12 is a rear elevational view of the lid illustrated in FIG. 11 for the electrical connector housing illustrated in FIGS. 1–7.

As seen in FIGS. 12 and 15, pivot lug 82 forms part of hinge assembly 48, and includes a spring recess 90 for receiving torsion spring 52 therein, and a pair of pivot holes 92 and 94 at each of its ends for receiving pivot pin 50 therethrough. More specifically, spring recess 90 extends longitudinally along pivot lug 82 with pivot holes 92 and 94 positioned along the longitudinal axis of spring recess 90 and in communication therewith such that pivot pin 50 passes through holes 92 and 94 as well as through spring recess 90. Spring recess 90 is provided with a flange 96 for engaging one end of torsion spring 52 as discussed more particularly below.

Figure 13:
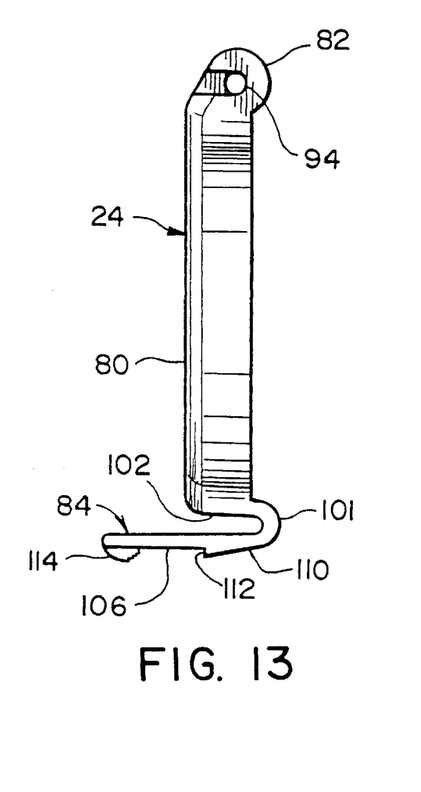
FIG. 13 is a right side elevational view of the lid illustrated in FIGS. 11 and 12 for the electrical connector housing illustrated in FIGS. 1–7.
Figure 14:
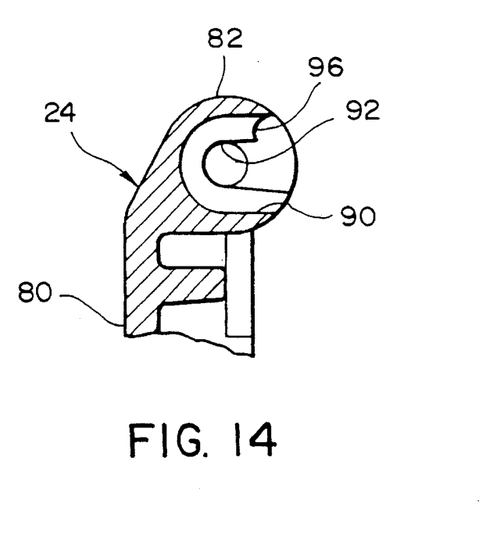
FIG. 14 is a partial cross-sectional view of the hinge portion of the lid illustrated in FIGS. 11–13 for the electrical connector housing illustrated in FIGS. 1–7.

As best seen in FIGS. 6, 7 and 13, curved-beam snap latch member 84 has a substantially U-shaped cross-sectional configuration that is integrally formed with body portion 80 of lid 24. Latch member 84 has a first leg 102, a bight portion 104 and a second leg 106. First leg 102 is integrally formed with body portion 80 and connected to second leg 106 by bight portion 104.

Second leg 106 of latch member 84 includes a pair of ramps 110 which form a pair of latch surfaces 112 for engaging locking surface 72 of latch bar 46. More specifically, latching surfaces 112 extend substantially parallel to the front or exterior face of mounting flange portion 22 and faces in the opposite direction of locking surface 72 of latch bar 48.

Latch member 84 also includes a release button 114 formed at the free end of latch member 84 for flexing latch member 84 to transversely bias latching surfaces 112 out of alignment with locking surface 72 of latch bar 46.

Lid 24 is latched to mounting flange portion 22 by pushing lid 24 towards mounting flange portion 22 which causes latch member 84 to snap onto latch bar 46 so as to cover open end 26 of tubular body portion 20. This snap action between latch member 84 and latch bar 46 causes free leg 106 to initially be transversely biased by ramps 110 engaging latch bar 46. After this initial biasing, the resiliency of latch member 84 will cause leg 106 to snap back to its substantial original position when latching surfaces 112 are substantially aligned with locking surface 72 of latch bar 46. In other words, during latching, ramps 110 act to initially bias leg 106 transversely away from latch bar 46 until ramps 110 are disengaged from latch bar 46. Once ramps 110 disengage from latch bar 46, the resiliency of latch member 84 springs the latch back to its substantially original position causing latching surfaces 112 of latch member 84 to engage locking surface 72 of latch bar 46.

To release lid 24 from its closed position, release button 114 is pressed upwardly such that latching surfaces 112 of leg 106 is disengaged from locking surface 72 of latch bar 46. Once latching surfaces 112 are disengaged from locking surface 72 of latch bar 46, the user can pull on the leg 106 of latch member 84 to pivot lid 24 about pivot pin 50 so as to expose electrical connector 12.

As seen in FIG. 16, pivot pin 50 has a cylindrical shaft portion 120, a slot 122 at one end of shaft portion 120, an annular groove 124 located at the same end as slot 122 on shaft portion 120, and a square head portion 126 located at the other end of shaft portion 120. Shaft portion 120 is designed to be received in pivot holes 54 and 56 of mounting flange portion 22 and in holes 92 and 94 of lid 24 as well as through spring recess 90 of lid 24 so as to pivotally couple lid 24 to mounting flange portion 22.

When pin 50 is properly installed, square head portion 126 engages the rectangular tubular surface 66 of pivot hole 56, and groove 124 engages cylindrical surface 62 of pivot hole 54. Preferably, the cylindrical surface 62 of pivot hole 54 is slightly smaller than the diameter of shaft portion 120 so that when shaft portion 120 is engaging cylindrical surface 62 of pivot hole 54, shaft portion 120 is compressed along slot 122 until cylindrical surface 62 of pivot hole 54 engages groove 124. Accordingly, pivot pin 50 is non-rotatably coupled to mounting flange portion 22 so that lid 24 rotates about stationary pivot pin 50.

Figure 17:
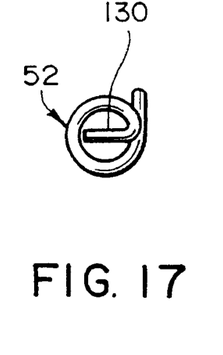
FIG. 17 is a left end elevational view of the hinge spring illustrated in FIG. 15 for the electrical connector housing illustrated in FIGS. 1–7.
Figure 18:
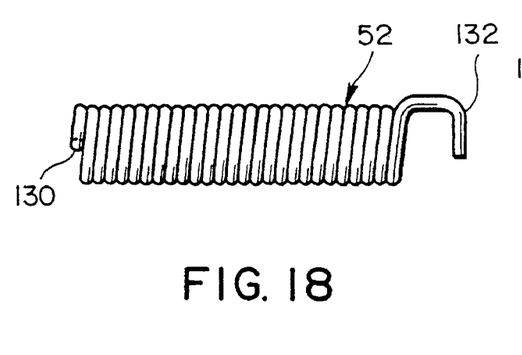
FIG. 18 is a front side elevational view of the hinge spring illustrated in FIGS. 15 and 17 for the electrical connector housing illustrated in FIGS. 1–7.
Figure 19:
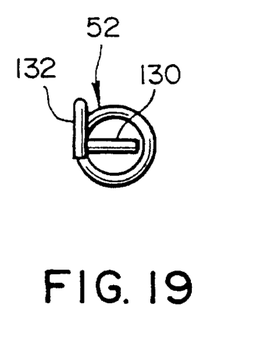
FIG. 19 is a right end elevational view of the hinge spring illustrated in FIGS. 15, 17 and 18 for the electrical connector housing illustrated in FIGS. 1–7.

Torsion spring 52 is a substantially conventional torsion spring constructed out of a suitable metallic material and has one end 130 bent radially inwardly as seen in FIG. 17, and its other end 132 bent in a U-shaped configuration and extending substantially tangent to the inner diameter of torsion spring 52 as seen in FIGS. 18 and 19. End 130 of torsion spring 52 is designed to be received in slot 122 of pivot pin 50, while end 132 of torsion spring 52 is designed to engage flange 96 formed in spring recess 90 of lid 24. Accordingly, end 130 of torsion spring 50 is fixed to pivot pin 50 which is non-rotatably held to mounting flange portion 22, while end 132 of torsion spring 52 engages lid 24 for movement therewith. In other words, when lid 24 is pivoted about pivot pin 50, flange 96 of lid 24 winds torsion spring 52 so as to increase the closing force of torsion spring 52 on lid 24. This is possible because end 130 of torsion spring 52 is held from movement by pivot pin 50 which in turn is held from movement due to its square head portion 126 which engages the square surface 64 of pivot hole 56. Of course, torsion spring 52 is prewound when installed about pivot pin 50 so that torsion spring 52 applies a closing force to lid 24 even in its closed position.

OPERATION OF LID 24

In use, lid 24 will normally be in its latched position covering open end 26 of tubular body portion 20 and covering electrical connector 12 to protect it from the environment. The user first pushes upwardly on release button 114 of latch member 84 to unlatch lid 24 from mounting flange portion 22. In particular, this upward pushing on release button 114 causes leg 106 of latch member 84 to be resiliently bent which in turn pulls latching surfaces 112 away from locking surface 72 of latch bar 46. In this position, lid 24 now can be freely pivoted about pivot pin 50 against the force of torsion spring 52.

After lid 24 is pivoted upwardly as seen in FIG. 1, the user can insert a mating electrical connector into tubular body portion 20 so as to electrically connect with electrical connector 12 mounted therein.

To close or latch lid 24 over open end 26 of tubular body portion 20, the user merely removes the mating electrical connector which allows lid 24 to pivot downwardly under the force of spring 52. Then, the user presses on the bottom end of body portion 80 of lid 24 to snap latch member 84 into engagement with latch bar 46. This snapping action is the result of ramps 110 engaging latch bar 46 which in turn causes leg of latch member 84 to be resiliently biased upwardly towards body portion 80 until ramps 110 ride over latch bar 46. At this point, the resiliency of latch member 84 causes leg 106 to snap back to substantially its original position with latching surfaces 112 of latch member 84 engaging locking surface 72 of latch bar 46. In this position, ring gasket 86 is compressed against the outer circular edge of extension 38 to create a weathertight seal between lid 24 and extension 38.

While only one embodiment has been chosen to illustrate the invention, it will be understood by those skilled in the art that various changes and modifications can be made herein without departing from the scope of the invention as defined in the appended claims.

What is claimed is:

1. An electrical connector housing for an electrical connector, comprising:

a flange portion with an opening formed therein for accessing electrical contacts of said electrical connector; and a lid having a body portion pivotally coupled to said flange portion at a first end by a hinge assembly for selectively covering said opening in said flange portion and releasably coupled to said flange portion at a second end by a latch assembly, said latch assembly including a resilient U-shaped latch member integrally formed with said body portion as a one-piece, unitary member, said latch member having a first leg coupled to said body portion and a second leg with a first integral latch surface formed thereon, and a locking surface integrally formed with said flange portion for releasably engaging said latch surface of said latch member via a snap-fit.

2. An electrical connector housing according to claim 1, wherein said second leg has a release button thereon for resiliently flexing said second leg to disengage said latch surface from said locking surface.

3. An electrical connector housing according to claim 1, wherein said latch member has a second latch surface formed thereon for engaging said locking surface of said flange portion.

4. An electrical connector housing according to claim 1, wherein said first latch surface is formed by a ramp which extends outwardly from said second leg for initially flexing said second leg during latching of said lid to said flange portion.

5. An electrical connector housing according to claim 1, further comprising a gasket mounted to said body portion.

6. An electrical connector housing according to claim 5, further comprising a spring for normally biasing said lid to a position covering said opening in said flange portion.

7. An electrical connector housing according to claim 6, wherein said first latch surface is formed by a ramp which extends outwardly from said second leg for initially flexing said second leg during latching of said lid to said flange portion.

8. An electrical connector housing according to claim 7, wherein said second leg has a free end for resiliently flexing said second leg to disengage said first latch surface from said locking surface.

9. An electrical connector housing according to claim 8, wherein said flange portion further includes a tubular extension surrounding said opening for engaging said gasket.

10. An electrical connector housing according to claim 9, wherein said flange portion further includes a latch bar coupled thereto by a pair of support members.

11. An electrical connector housing according to claim 10, wherein said hinge assembly includes at least one pivot lug extending from said flange portion, at least one pivot lug extending coupled to said body portion and a pivot pin interconnecting said pivot lugs.

12. An electrical connector housing according to claim 11, wherein said pivot lug of said lid has a recess for receiving said spring therein.

13. An electrical connector housing according to claim 12, wherein said recess has a flange for engaging a first end of said spring and said pivot pin has a slot for receiving a second end of said spring to bias said lid to a position covering said opening.

14. An electrical connector housing according to claim 13, wherein said flange portion has a plurality of mounting holes formed therein.

15. An electrical connector housing according to claim 14, wherein said flange portion has a tubular body portion extending rearwardly therefrom for receiving an electrical connector therein.

16. An electrical connector housing according to claim 15, wherein said tubular body portion has at least one mounting lug for coupling the electrical connector thereto.

17. An electrical connector housing for mounting an electrical connector thereto, comprising a mounting flange portion having a rearwardly extending tubular body portion with at least one electrical connector mounting lug, an electrical connector opening for receiving a mating electrical connector therethrough, a forwardly extending annular extension surrounding said opening, and a plurality of mounting holes;

a lid having a body portion pivotally coupled at a first end to said mounting flange portion for selectively covering said opening in said mounting flange portion and releasably coupled at a second end to said mounting flange portion;

a hinge assembly formed between said mounting flange portion and said first end of said lid, said hinge assembly including at least one pivot lug integrally formed with said mounting flange portion, at least one pivot lug integrally formed with said first end of said lid and a pivot pin interconnecting said pivot lugs; and a latch assembly formed between said mounting flange portion and said second end of said lid, said latch assembly including
 a U-shaped latch member integrally formed with said body portion as a one-piece, unitary member with a first leg coupled to said body portion and a resilient second leg with a latch surface coupled to said first leg by a bight portion, and
 a locking surface integrally formed with said flange portion for releasably engaging said latch surface of said latch member via a snap-fit.

18. An electrical connector housing according to claim 17, wherein said body portion is cup shaped with a gasket coupled thereto for engaging said extension.

19. An electrical connector housing according to claim 18, further comprising a spring for normally biasing said lid to a position covering said opening in said flange portion.

20. An electrical connector housing according to claim 18, wherein said mounting flange portion further includes a latch bar coupled thereto by a pair of support members.

* * * * *